United States Patent Office 3,328,169
Patented June 27, 1967

3,328,169
MENADIONE BISULFITE ADDUCTS OF DICYANO-
DIAMIDINE - 2,4,6 - TRIAMINO - 1,3,5 - TRIAZINE
AND PYRIMIDINES SUBSTITUTED AT THE TWO
POSITIONS AND FEEDS
Jan B. Nanninga, Laren, North Holland, Netherlands, assignor, by mesne assignments, to Heterochemical Corporation, Valley Stream, N.Y., a corporation of New York
No Drawing. Filed Oct. 24, 1963, Ser. No. 318,516
Claims priority, application Netherlands, Nov. 9, 1962, 285,292
11 Claims. (Cl. 99—2)

This invention relates to Vitamin K active substances. More especially, it relates to novel and useful bisulfite adducts of menadione and to compositions containing them.

Menadione bisulfite adducts such as the sodium bisulfite adduct are well known. They are described, for example, in U.S. Patent 2,367,302 and Swiss Patent 261,219. They are water soluble compounds manifesting strong Vitamin K activity and are especially valuable as anti-hemorrhagic agents.

The sodium bisulfite adduct is widely employed in animal feeds, particularly poultry feeds where, although useful for other purposes, it is especially useful in the control of hemorrhagic disease in the birds. In this use, however, it has the disadvantage of limited stability in the presence of moisture, especially at high pH values. It has been shown by Baker et al. [JACS 64, 1096 (1942)] that at relatively low pH values the compound isomerizes to an inactive isomer and that the rate of isomerization increases with increasing pH. At a pH of 8.5 the compound decomposes into menadione and sodium bisulfite.

Because of this decomposition in the presence of feed ingredients which may be moist, it has long been a problem in the art to find menadione derivatives of decreased solubility in water. In this regard, the menadione sodium bisulfite adduct is especially disadvantageous because it possesses 2–3 molecules of water of crystallization.

Since in the preparation of various menadione products especially poultry feeds, the menadione derivatives are often mixed with moist materials, it is evident that in the preparation of such products, it would be preferable to employ compounds of relatively low solubility in water, although not so low as to inhibit absorption by the host animal. The reason is that the menadione derivative such as menadione sodium bisulfite would react with local excesses of water and be exposed to decomposition.

It is also desirable that the aqueous solutions containing the dissolved menadione derivative have a low pH so that the rate of isomerization and other decomposition will be low. Saturated menadione sodium bisulfite solutions have a hydrogen ion concentration corresponding to a pH of approximately 6.5. The rate of isomerization therefore, is quite high.

Accordingly, menadione derivatives for use in Vitamin K active compositions such as chicken feeds and the like should preferably have the following properties: (1) they should not add water of crystallization, (2) they should be only slightly soluble in water and (3) their saturated aqueous solutions should have a hydrogen ion concentration conducive to a low rate of decomposition, preferably corresponding to a pH value of less than 4.5.

In accordance with this invention, it has been found that such derivatives can be obtained by reaction between menadione sodium bisulfite or other water soluble bisulfite adducts and certain weakly basic organic compounds. The desired compounds may be formed by mixing concentrated solutions of the menadione derivative such as menadione sodium bisulfite or other alkali or alkaline earth metal bisulfite with concentrated aqueous solutions of salts of the selected organic base. The derivatives which are menadione bisulfite adducts of the organic base are only slightly soluble in water. They, therefore, precipitate and may be collected by filtration.

An alternative process for the preparation of the desired compounds is by reacting menadione with the bisulfite salt of the selected organic base. This is not the presently preferred process, however, since the rate of reaction is slow.

In addition to their low solubility in water, the compounds of this invention do not add water of crystallization and their saturated aqueous solutions have a low pH.

Several nitrogenous organic bases are suitable for the preparation of the compounds of this invention. The preferred compounds possess the part structure represented by

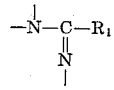

wherein $R_1$ may be, for example, hydrogen, hydroxyl, amino or mercapto. The structure may be a portion of an open chain compound or a heterocyclic ring containing two or more nitrogen atoms. The preferred compounds are triazine, pyrimidine and guanidine derivatives.

In the case of pyrimidine derivatives, the pyrimidine ring may be substituted with groups such as hydroxy, amino or alkyl. Derivatives which are substituted by amino or hydroxyl groups at the 2-position and by methyl groups at the 4- and/or 6-positions are especially suitable.

Only triamino-triazine derivatives are sufficiently basic to form a triazine derivative of this invention.

Of the guanidine derivatives, the preferred is dicyanodiamidine (N-carboxamido-guanidine).

The menadione bisulfite adducts of this invention are crystalline compounds containing no water of crystallization. They are only slightly soluble in water and their saturated aqueous solutions have a low pH which is preferably lower than 4.5. At a pH above about 8.5 they split into free menadione and the bisulfite of the original organic base so that their menadione content can be determined by the procedure described in the 15th edition of the U.S. Pharmacopeia at page 394. They are useful in the preparation of animal feeds such as poultry feeds and the like and in this use they are mixed in effective amounts with the usual carriers at the concentrations generally employed with other menadione bisulfite addition products such as menadione sodium bisulfite.

A variety of animal feeds may be prepared by incorporating the compounds of this invention in the usual feed compositions which may contain for example corn meal, lactose meal, wheat shorts and/or distillers dry solubles. Generally the feed compositions will contain from about 1 to about 20 grams of at least one adduct of this invention per ton of feed. A typical poultry feed composition may be prepared by thoroughly mixing

| | | |
|---|---|---|
| Yellow corn meal | lbs__ | 1200 |
| Soybean meal | lbs__ | 700 |
| Bone meal | lbs__ | 50 |
| Limestone flour | lbs__ | 30 |
| Iodized salt | lbs__ | 20 |
| Manganese sulfate | lbs__ | 0.06 |
| Cod liver oil concentrate | lbs__ | 0.4 |
| Sulfaquinoxaline | lbs__ | 0.30 |
| Riboflavin | gm__ | 3 |
| Bisulfite adduct | gm__ | 1 |

One or more compounds of the invention may be provided in premixes or concentrates including vitamin concentrates which may be then compounded with the animal feed. The premix is generally prepared to contain approximately 4 grams of one or more adducts per pound although more concentrated compositions containing as much as 64 or more grams of adduct per pound are also useful. A typical premix might contain the following ingredients:

| | | |
|---|---|---|
| Soybean meal | lbs | 2.2 |
| Choline chloride | lbs | 13.2 |
| Nicotinic acid | gm | 500 |
| Calcium pantothenate | gm | 200 |
| Thiamin | gm | 40 |
| Riboflavin | gm | 100 |
| γ-Tocopherol acetate | gm | 120 |
| Bisulfite adduct | gm | 40 |

The menadione bisulfite adducts of this invention may also be used in the preparation of pharmaceutical compositions for use in the control of blood clotting time in pathogenic conditions where hemorrhaging is a problem. These compositions may be composed of the usual pharmaceutical excipients generally employed for the administration of previously known menadione bisulfite adducts and will contain an effective amount of a compound of this invention. The physician or veterinarian will determine the amount of the active ingredient to be employed in the selected dosage unit. The preferred amount will depend upon a variety of factors including the extent of the disease and the response of the patient. The compositions may be isotonic sterile aqueous compositions. They may be elixirs containing various flavoring ingredients or capsules or tablets with the usual extending agents such, for example, as corn starch or milk sugar. The dosage is generally of the same order of magnitude as the dosage employed with previously known menadione compounds.

The following non-limiting examples are given by way of illustration only.

EXAMPLE I

A solution of 5 grams of the sulfate salt of dicyano-diamidine sulfate in 100 ml. of water is mixed with a solution of 9.3 grams of menadione sodium bisulfite in 15 ml. of water. Almost at once the menadione adduct of dicyano-diamidine bisulfite compound crystallizes out; after standing for a while the crystals are filtered by suction, washed with water and dried at a temperature of 60° C. The yield is 8.5 grams of white crystals, sparingly soluble in water. The saturated aqueous solution shows a pH less than 4.5 and their moisture content is less than 1%.

EXAMPLE II

A lukewarm solution of 2.5 grams of 2,4,6-triamino-1,3,5-triazine in 110 of ml. of 0.4 N hydrochloric acid is mixed with a solution of 9 grams of medadione sodium bisulfite in 20 ml. of water. A thick precipitate of the menadione bisulfite adduct of 2,4,6-triamino-1,3,5-triazine is immediately formed. After standing for some time, it is filtered by suction, washed with water and dried at a temperature of 60° C. There is obtained 7.5 grams of white crystals, almost insoluble in water. Their moisture content is less than 1% and the saturated aqueous solution shows a pH less than 4.5.

EXAMPLE III

A solution of 1.26 grams of 2,4-diamino-6-hydroxy-pyrimidine in 15 ml. of 1.3 N HCl is mixed with a solution of 3.5 grams of menadione sodium sulfite in 10 ml. of 0.5 N HCl. Almost immediately a precipitate is formed of the menadione 2,4-diamino-6-hydroxy-pyrimidinium bisulfite compound. The latter is filtered by suction, washed with water and dried at a temperature of 60° C. The yield is 3.5 grams of white crystals, sparingly soluble in water. Their moisture content is less than 1% and their saturated aqueous solution has a pH lower than 4.5.

EXAMPLE IV

A solution of 5.0 grams of 2-hydroxy-4,6-dimethyl-primidinium sulfate in 20 ml. of water is mixed with a lukewarm solution of 9.3 grams of menadione sodium bisulfite in 25 ml. of water. Almost immediately a white precipitate is formed, which, after standing for some time, is filtered by suction and then dried at a temperature of 60° C. The yield is 9.1 grams of white crystals, slightly soluble in water. Their saturated aqueous solution shows a pH lower than 4.5. The crystals possess a moisture content of less than 1%.

EXAMPLE V

A solution of 6.0 grams of 2-amino-4,6-dimethyl-pyrimidine in 50 ml. of 2 N hydrochloric acid is mixed with a solution of 15.0 grams of menadione sodium bisulfite in 30 ml. of lukewarm water. Almost immediately a thick crystalline precipitate is formed. After standing for more time this precipitate is filtered by suction, washed and dried at a temperature of 60° C. There is obtained 16.9 grams of white crystals, sparingly soluble in water. Their saturated aqueous solution shows a pH lower than 4.5 and their moisture content is less than 1%.

EXAMPLE VI

A total of 3.0 grams of the 2-hydroxy-4,6-dimethyl-pyrimidinium menadione bisulfite compound (prepared as in Example IV) is intimately mixed with 100 grams of inert amorphous aluminium silicate, containing 9.5% moisture as determined by the Karl Fischer method. A sample of this mixture is heated in a hermetically closed, half-filled, container for a period of ninety hours at a constant temperature of 50° C. After this heating period the menadione content is again determined by the method according to the U.S. Pharmacopeia, 15th edition, and it is found that 84% of the original amount of menadione is still present. When this experiment is repeated under identical conditions with pure menadione sodium bisulfite instead of the 2-hydroxy-4,6-dimethyl-pyrimidinium menadione bisulfite, then the amount of menadione present after heating is found to be only 11% of the original.

What is claimed is:

1. Menadione bisulfite adducts of organic nitrogenous bases, said bases being selected from the group consisting of dicyano-diamidine; 2,4,6-triamino-1,3,5-triazine and pyrimidines substituted at the 2-position with a substituent selected from the group consisting of hydroxyl, amino and mercapto groups; said adducts being characterized by low solubility in water and a low pH in saturated aqueous solutions.

2. A menadione bisulfite adduct of pyrimidine as in claim 1 substituted at the 4- and the 6-position with methyl groups.

3. The menadione bisulfite adduct of 2-hydroxy-4,6-dimethyl-pyrimidine.

4. The menadione bisulfite adduct of dicyano-diamidine.

5. The menadione bisulfite adduct of 2,4,6-triamino-1,3,5-triazine.

6. The menadione bisulfite adduct of 2.4-diamino-6-hydroxy-pyrimidine.

7. The menadione bisulfite adduct of 2-amino-4,6-dimethyl pyrimidine.

8. An animal feed composition containing from 1 to 20 grams per ton of a menadione bisulfite adduct of menadione and an organic nitrogenous base, said base being selected from the group consisting of dicyano-diamidine; 2,4,6-triamino-1,3,5-triazine and pyrimidines substituted at the 2-position with a substituent selected from the group consisting of hydroxyl, amino and mercapto groups; said adducts being characterized by low solubility in water and a low pH in saturated aqueous solutions.

9. An animal feed concentrate containing from 4 to 64 grams per pound of a menadione bisulfite adduct of an organic nitrogeous base, said base being selected from the group consisting of dicyano-diamidine; 2,4,6-triamino-1,3,5-triazine and pyrimidines substituted at the 2-position with a substituent selected from the group consisting of hydroxyl, amino and mercapto groups; said adducts being characterized by low solubility in water and a low pH in saturated aqueous solutions.

10. An animal feed composition containing from 1 to 20 grams per ton of the menadione bisulfite adduct of 2-hydroxy-4,6-dimethyl-pyrimidine.

11. The animal feed concentrate containing from 4 to 64 grams per pound of the menadione bisulfite adduct of 2-hydroxy-4,6-dimethyl-pyrimidine.

References Cited

UNITED STATES PATENTS

| | | | |
|---|---|---|---|
| 2,367,302 | 1/1945 | Moore et al. | |
| 2,385,365 | 9/1945 | Link | 260—396 |
| 2,827,377 | 3/1958 | Frost | 99—2 X |
| 3,079,260 | 2/1963 | Galler | 99—2 |
| 3,079,261 | 2/1963 | Berruti | 99—4 X |
| 3,196,018 | 7/1965 | Galler | 99—4 X |

A. LOUIS MONACELL, *Primary Examiner.*

D. DONOVAN, *Assistant Examiner.*